United States Patent [19]

Khudenko

[11] Patent Number: 5,348,629
[45] Date of Patent: Sep. 20, 1994

[54] METHOD AND APPARATUS FOR ELECTROLYTIC PROCESSING OF MATERIALS

[76] Inventor: Boris M. Khudenko, 744 Moores Mill Rd., Atlanta, Ga. 30327

[21] Appl. No.: 650,936

[22] Filed: Feb. 5, 1991

Related U.S. Application Data

[63] Continuation-in-part of Ser. No. 437,655, Nov. 17, 1989, abandoned, and Ser. No. 492,651, Mar. 13, 1990.

[51] Int. Cl.[5] .............................................. C02F 1/46
[52] U.S. Cl. .................................. 204/130; 204/131; 204/149; 204/151; 204/78; 204/107; 204/109
[58] Field of Search ............... 204/149, 107, 109, 130, 204/140, 151, 78, 131

[56] References Cited

U.S. PATENT DOCUMENTS

| | | | |
|---|---|---|---|
| 1,514,737 | 11/1924 | Smith | 204/150 |
| 2,852,453 | 9/1958 | Hausner | 204/131 |
| 3,457,152 | 7/1969 | Maloney, Jr. et al. | 204/131 |
| 3,959,096 | 5/1976 | Langer | 204/107 |
| 3,994,789 | 11/1976 | Langer et al. | 204/108 |
| 4,004,993 | 1/1977 | Horner et al. | 204/131 |
| 4,028,199 | 6/1977 | Holland | 204/109 |
| 4,035,269 | 7/1977 | Mastrorilli | 204/150 |
| 4,107,009 | 8/1978 | Everett | 204/129 |
| 4,280,887 | 7/1981 | Konstantouros | 204/150 |
| 4,291,125 | 9/1981 | Greatbatch | 435/240 |
| 4,421,616 | 12/1983 | Bjune | 204/115 |
| 4,619,745 | 10/1986 | Porta et al. | 204/151 |
| 4,702,806 | 10/1987 | Miller et al. | 204/106 |
| 4,707,226 | 11/1987 | Dapperheld | 204/81 |

OTHER PUBLICATIONS

Khudenko, "Mathematical Models of Cementation Processes" Aug. 1987 pp. 681-702. Journal of Environ. Engineering.

*Primary Examiner*—John Niebling
*Assistant Examiner*—Arun S. Phasge
*Attorney, Agent, or Firm*—Needle & Rosenberg

[57] ABSTRACT

A method and apparatus for the electrochemical processing of materials in which the material to be processed is located within an electrolyte that is subjected to strong local electromagnetic fields in a migrational transport layer, causing strong electromagnetic and electrokinetic forces capable of effecting the chemical and physical conversions in the materials to be processed. This migrational transport layer can be induced either by creating a cementation system, applying an outside source of current to an electrode system, or a combination of both.

48 Claims, 9 Drawing Sheets

FIG. 2
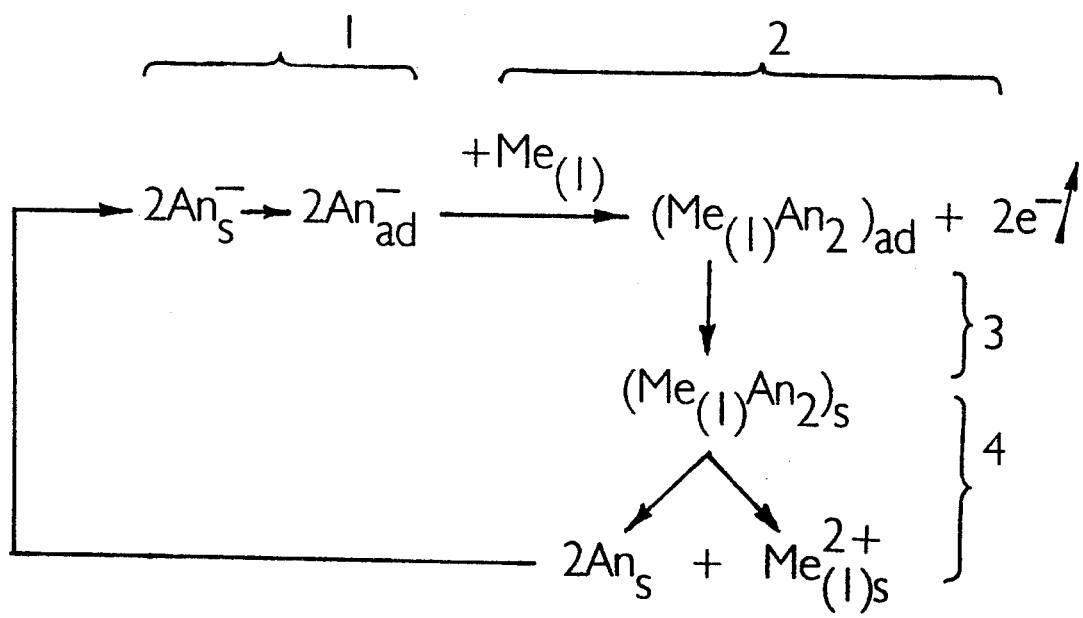
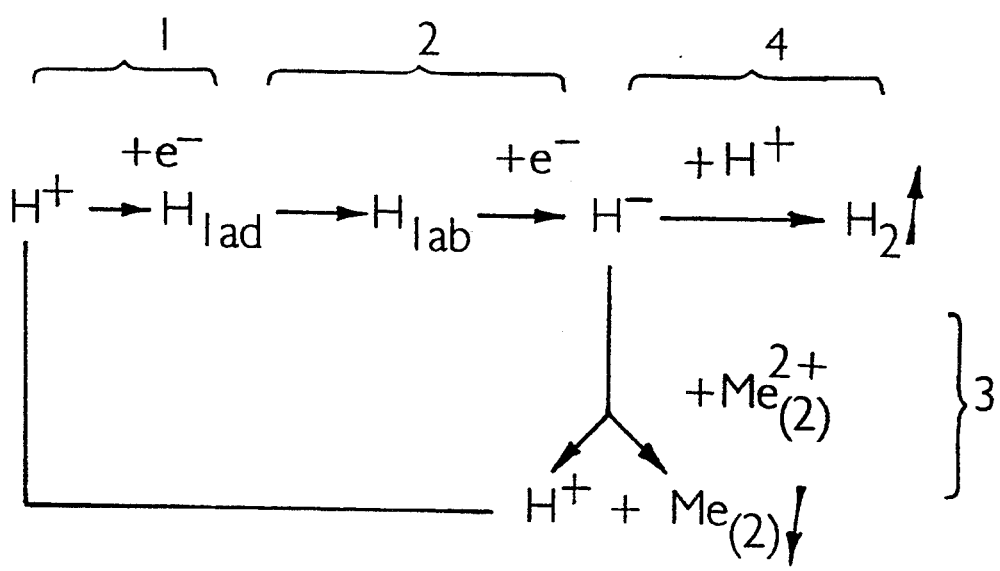
FIG. 3

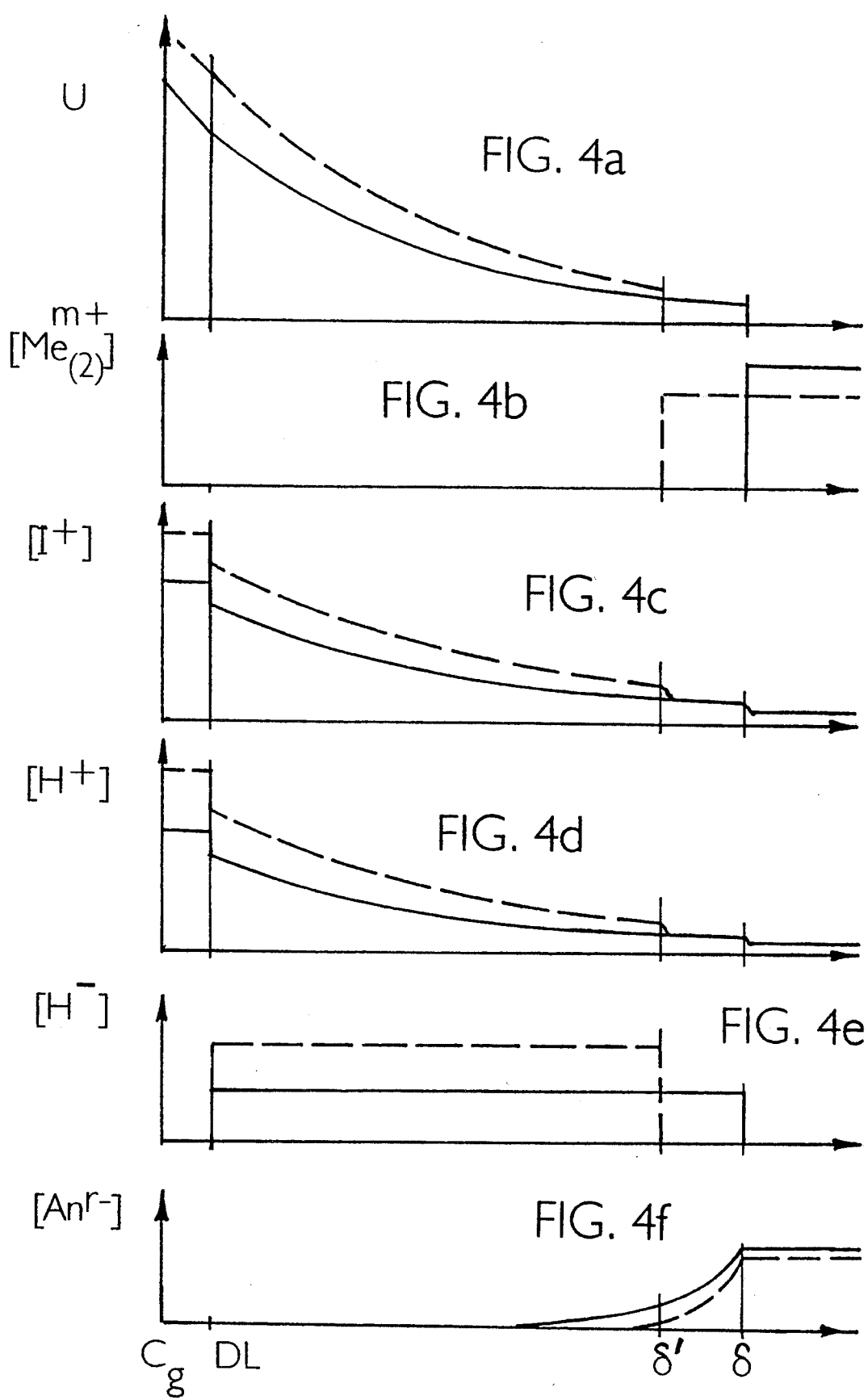

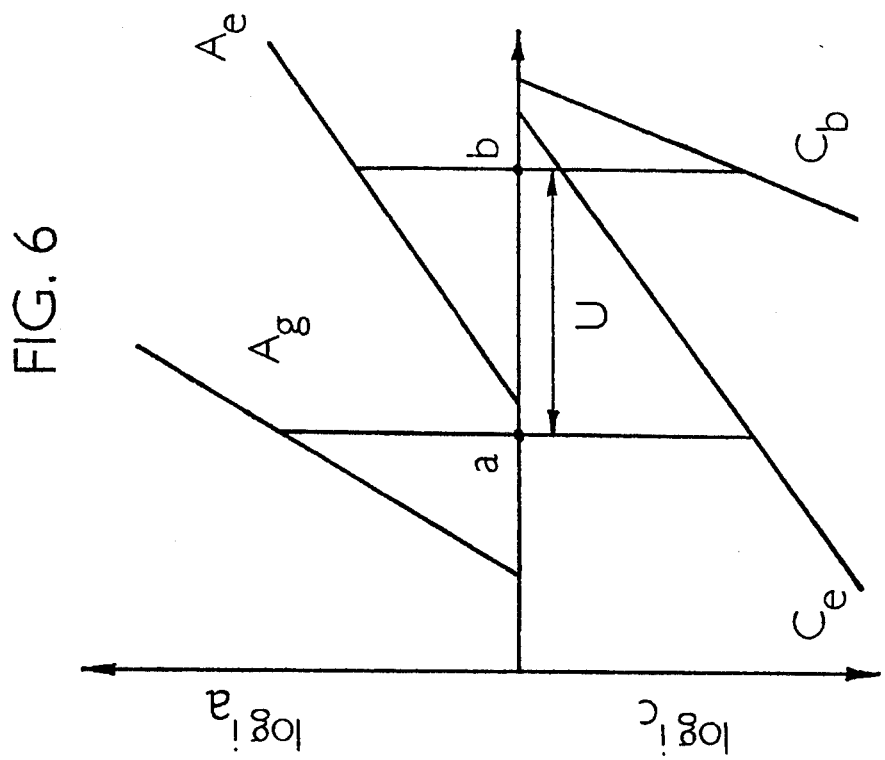
FIG. 6
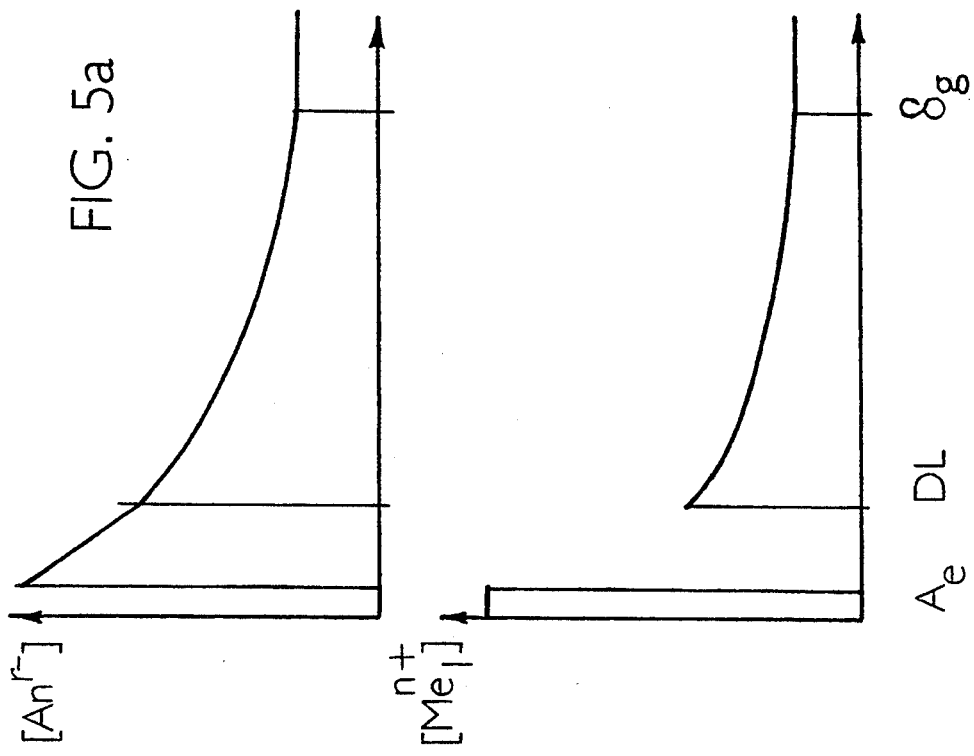
FIG. 5a
FIG. 5b

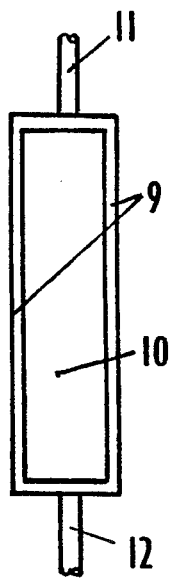
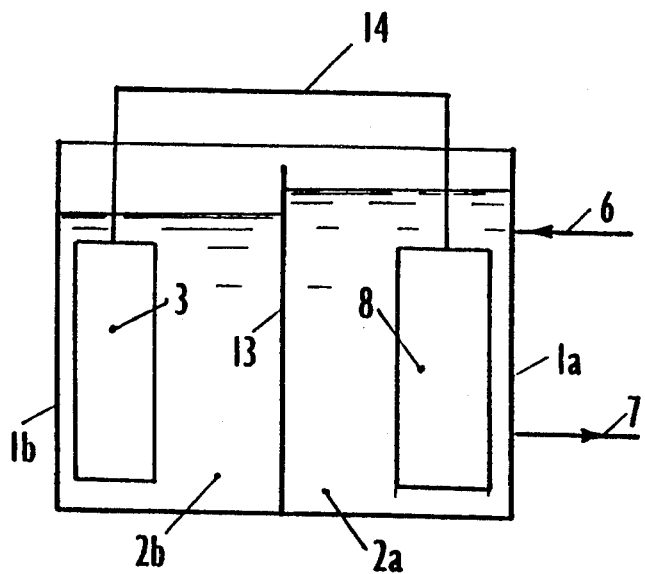
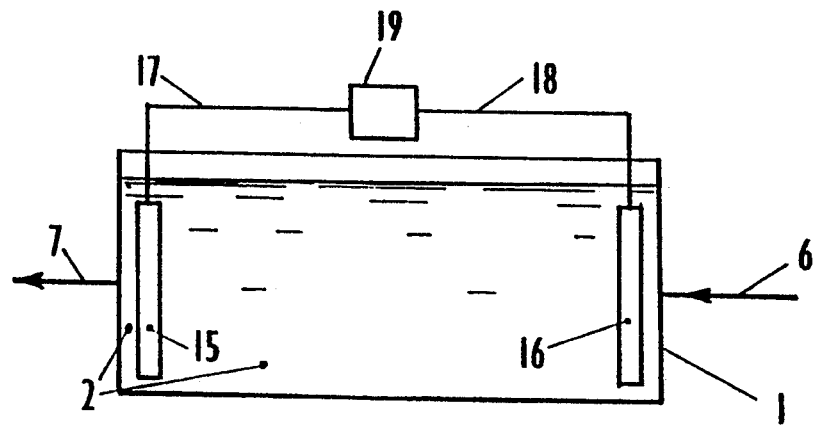
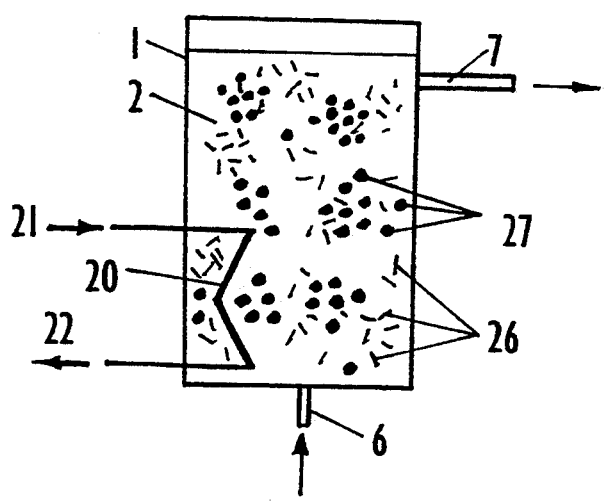
FIG. 11
FIG. 12
FIG. 13
FIG. 14

METHOD AND APPARATUS FOR ELECTROLYTIC PROCESSING OF MATERIALS

BACKGROUND OF THE INVENTION

This application is a continuation-in-part of the applicant's co-pending applications, Ser. No. 07/437,655, filed on Nov. 17, 1989 now abandoned and Ser. No. 07/492,651, filed on Mar. 13, 1990.

The present invention relates to the class of electrochemical processes used for processing of materials in electrolytes, particularly for the oxidation-reduction of organics, radically-induced dimerization and polymerization, the coagulation and collection of mineral and organic suspended particles and emulsions, and the inactivation and killing of microorganisms. The method can be used in water and waste treatment industries, chemical, pharmaceutical, biochemical, food and other industries.

Electrochemical methods are often used for the oxidation-reduction of organic and inorganic constituents, coagulation, flotation, collection of charged particles in suspensions and emulsions, precipitation and crystallization, dimerization and polymerization, disinfection and other processes. Various electrochemical processes are described in literature sources including the following:

Bockris, J. et al. (1981) Comprehensive Treatise of Electrochemistry, Plenum Press, New York - London Levich, V. G., (1962) Physiochemical Hydrodynamics, Prentice Hall, Englewood Cliffs, N.J.

Jakovlev, S. V., Krasnoborod'ko, J. G., and Rogov, V. M. (1987) Technology of electrochemical treatment of water, Publishing House Stroyizdat, Leningrad (Russian).

Bard, A. J. and Faulkner, L. R., (1980) Electrochemical Methods, Fundamentals and Applications, John Wiley & Sons, New York, Chichester, Brisbane, Toronto.

Hausner, T. K., U.S. Pat. No. 2,852,453, issued Sep. 16, 1958, "Control of Cellulose Precipitation Bath Concentrations".

Horner, D. E. et al., U.S. Pat. No. 4,004,993, issued Jan. 25, 1977, "Electrolytic Trapping of Iodine from Process Gas Streams".

Maloney, T. N. et al., U.S. Pat. No. 3,457,152, issued Jul. 22, 1969, "Electrolytic Apparatus for Removing Trace Metals".

Greatbatch, W., U.S. Pat. No. 4,291,125, issued Sep. 22, 1981, "Method for Electronic Control of Infections Using Silver Ions".

However, none of these references describe the induction of a migrational layer using means such as a cementation system or high current density, or describe systems that inherently possess such migrational layer triggers, as used in the instant invention to efficiently process various materials. Major disadvantages of the existing electrochemical processes include the following: a low rate of material processing (typically from 20–30 minutes to 3–10 hours); high energy consumption caused mainly from side reactions such as evolution of hydrogen, oxygen, or chlorine; high consumption of reagents, such as acids or salts that are added in order to increase the electrolyte conductance and reduce energy losses; and complex and expensive equipment.

SUMMARY OF THE INVENTION

The present invention relates to a method and apparatus for electrochemically processing materials in which the particles of a material are contained within an electrolyte and are subjected to local electromagnetic forces in a migrational transport layer, This migrational transport layer can be induced either by creating a cementation system, applying an outside source of current to an electrode system, or a combination of both, The intensity of the local electromagnetic fields can be controlled in various ways such as adding promoters, indifferent ions, complexing agents, or anions to the electrolyte; optimizing the mixing rate of the electrolyte; or controlling the temperature of the electrolyte, The major active species in the migrational transport layer are hydrogen and hydride ions. The strength of the local electromagnetic fields within the migrational layer is sufficient to create short impulses of plasma and produce very substantial electroosmotic and electrophoretic forces, Accordingly, it is an object of the present invention to provide a method and apparatus for electrochemically treating materials wherein the process rate is greatly increased. Another objective of the present invention is to provide an electrochemical method for materials processing wherein specific induction means for creating a migrational transport layer are used for controlling the process rate, yield and efficiency. Yet another objective is to reduce the process costs by using smaller apparatus and inexpensive reagents.

Furthermore, it is an object of this invention to provide an electrochemical method of materials processing in which the particles of material are subjected to strong local electromagnetic forces in a migrational transport layer. This migrational transport layer may be induced by the creation of a cementation system, the application of current from an outside source, or both.

More particularly, it is an object of the present invention to provide a method and apparatus for electrochemically processing materials in which a migrational transport layer is induced by submerging a sacrificial metal in an aqueous electrolyte that contains a salt of a second metal that is mere noble than the sacrificial metal. A further object of this invention is to increase the surface area of the cathode by connecting a cathodic material more noble than the sacrificial metal to the sacrificial metal. A still further object of this invention is to submerge the sacrificial metal and the connected cathodic material in separate compartments such that the sacrificial metal is submerged in a cementation electrolyte and the cathodic material is submerged in an aqueous electrolyte.

Furthermore, it is an object of the present invention to provide a method and apparatus for the electrochemical processing of materials in which an aqueous electrolyte is brought into contact with an electrode system having at least one anode and at least one cathode and a migrational transport layer is induced by applying a high current density to a cathode. The current can be applied as direct current pulses. A further object of this invention is to increase the intensity of the local electromagnetic fields by applying a polarizing current to the electrode system to dialyze the electrolyte.

It is also an object of the present invention to provide a method for electrochemically processing materials through oxidation-reduction, dimerization and polymerization or coagulation processes, or through the collection and separation of suspensions and emulsions or inactivation and/or destruction of microorganisms.

These and other objects and advantages of the present invention are apparent to a person skilled in the art from the following detailed description.

BRIEF DESCRIPTION OF DRAWINGS

FIG. 2 is an illustration of the electrode processes and transformations occurring at anodic sites in cementation systems;

FIG. 3 is an illustration for the electrode processes and transformations occurring at the cathodic sites in cementation systems operated in migrational regimes;

FIG. 4 is a graphic representation of the potentials and distributions of major ionic species in the galvanic cell;

FIG. 5 is a graphic representation of distributions of anions and cations at the anodic sites;

FIG. 6 is a current-potential diagram of the cementation system;

FIG. 11 is a cross-section of a flow through noble metallic cathode for pulsing noble metal salts in the course of reinduction of migrational regimes;

FIG. 12 is a cross-section of a reactor for cementation induced processing of materials with separate cementation and processing zones.

FIG. 13 is a cross-section of a reactor for processing of materials driven by an external source of electricity;

FIG. 14 is an illustration of a fluidized bed reactor for the cementation induced processing of materials;

DETAILED DESCRIPTION OF THE INVENTION

This invention relates to a method and apparatus for processing of materials in a migrational transport layer formed off the surface of a metal in an electrochemical system. The following subsections describe the formation mechanism, statics, and dynamics of a migrational transport layer in an electrochemical system; the mechanisms usable for processing materials that occur in such a layer; the variables that control the layer; and preferred embodiments utilizing the layer.

As used herein, the term "promoter" refers to negatively charged ions or neutral species capable of being reduced at the cathode. Examples of promoters include, but are not limited to, $Cr_2O_7^{2-}$ and $VO_4^{3-}$. The term "indifferent ion" refers to an ion that does not participate in reactions at either the cathode or anode. Examples of indifferent ions include, but are not limited to, $Li^+$, $Na^+$, and $K^+$. A "complexing agent" refers to a mineral or organic species that can complex with a metal to slow down the metal's rate of diffusion. Examples of complexing agents include, but are not limited to, $Cl^-$, $NH_3$, $CN^-$, and EDTA. "Noble metal species" or "noble species", "noble metal particles" or "noble particles", and "noble species", "noble metal particles," or "noble particles", and "noble metal ions" or "noble ions" refer to metal species, particles and ions, respectively, that are electropositive relative to another metal, usually referred to as the "sacrificial" or electronegative metal. Examples of noble species can include, but are not limited to, $Cu^{2+}$, $Ag^+$, $Hg^+$, $Cd^{2+}$, $Cr_2O_7^{2-}$. The term "cementation electrolyte" refers to an electrolyte that contains at least one noble species. The term "filament" is meant to refer to a protrusion of any shape that ends in a relatively sharp point. The term "electrochemical processing of materials" is meant to refer to any and all chemical, physical or chemicalphysical conversions, transformations and separations effected by electromagnetic and/or electrokinetic forces.

1. The Migrational Transport Layer and Related Electrode Processes

As described in Boris Mikhail Khudenko, "Mathematical Models of Cementation Processes", *Proc. Env. Eng. Div., Amer. Soc. Civil Eng.*, 113:681–701(1987), two possible mechanisms for transferring species across the boundary layer at cathodic sites are possible: diffusional and migrational. When the species participating in electrochemical processes are transported by diffusion, all cathodic reactions occur at the surface of the cathodic sites, or, in accordance with conventional models, within the adsorption layer at this surface.

Figure 1:
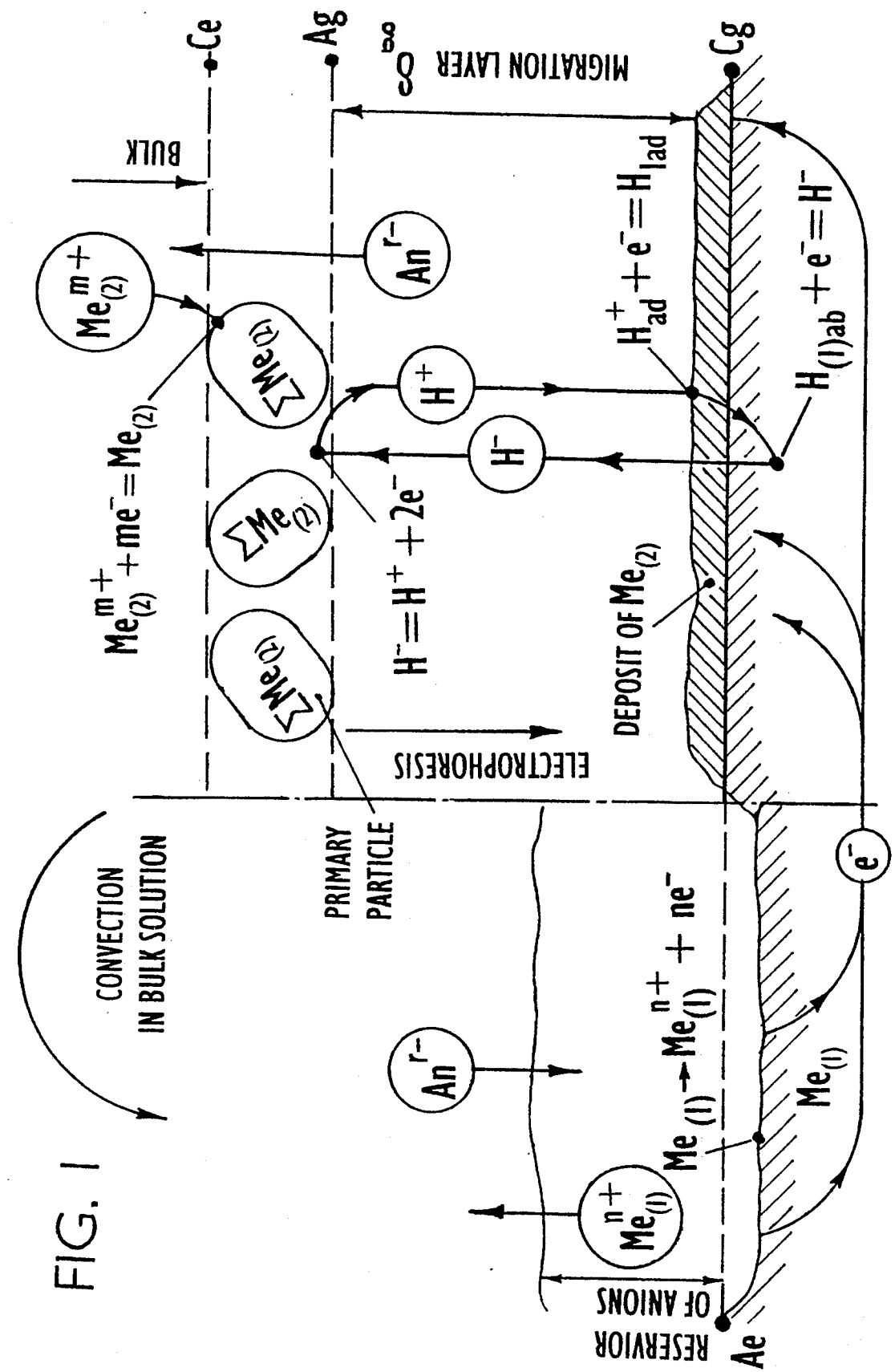
FIG. 1 is an illustration of the migrational mechanism of cementation processes.

A schematic showing the electrochemical reactions occurring during the migrational transport of species is illustrated in FIG. 1. Because the properties of metal surfaces are nonuniform, multiple electrolytic (cathode $C_e$ and anode $A_e$) and galvanic (anode $A_g$ and cathode $C_g$) cells are spontaneously induced. A cell is termed "electrolytic" based upon the original cementation process objective of reducing noble species through electrolysis. Cells that do not reduce noble species through electrolysis are referred to as galvanic cells. Electrolytic cells include anodic sites $A_e$, a boundary layer $B_e$ at anodic sites $A_e$, the bulk solution, and cathodes $C_e$, located opposite the cathodic sites $C_g$ on the sacrificial metal surface. Galvanic cells are comprised of cathodic sites $C_g$, a migration layer $\delta_g$, and anodes $A_g$ adjacent to cathodes $C_e$. Anodes $A_g$ and cathodes $C_e$ are associated with primary particles marked in FIG. 1 by the symbol $\Sigma Me_{(2)}$. $Me_{(1)}$ refers to sacrificial metal species and $Me_{(2)}$ refers to noble metal species.

Typically, the bulk solution contains noble ions, either cations $Me_{(2)}^{m+}$, such as $Cu^{2+}$, $Ag^+$, noble metal containing anions, such as $Cr_2O_7^{2-}$, or other electron accepting species; acids, such as $H_2SO_4$ or HCl, or alkalies for pH control; and indifferent ions $I^{s+}$, $An^{r-}$, which do not participate in electrode reactions. Complexing agents, for example cyanides, may also be used.

Electrode processes and transformations occurring at the anodic sites $A_e$ of FIG. 1 in electrolytic cells are illustrated in FIG. 2, using univalent anions and a divalent sacrificial metal as an example. These processes and transformations involve the following: (1) adsorption of anions $An^{r-}$, from the bulk solution on the surface of sacrificial metal Me$_{(1)}$; (2) formation of a salt and liberation of electrons that flow to cathodes C$_g$ in galvanic cells; (3) dissolution and (4) dissociation of salt molecules. Dissolved metal cations remain in the bulk solution while the anions may return to the anodes A$_g$.

Transformations at the cathodic sites, electrodes C$_g$, A$_g$, and C$_e$ of FIG. 1, involve the following steps as shown in FIG. 3: (1) acceptance of an electron by hydrogen ion and the consequential formation of adsorbed atomic hydrogen H$_{ad}$, (2) diffusion of the atomic hydrogen into the body of the sacrificial metal to produce H$_{ab}$, the resulting association with electroconducting electrons to form hydride ion, H$^-$, and the ejection of a negative particle (a hydride ion) from cathodes C$_g$ as shown in FIG. 1; (3) transportation of hydride ions in the boundary layer and reaction with noble species, which results in the formation of reduced products and in the recovery of hydrogen ions; and (4) a side reaction between hydride and hydrogen ions to form molecular hydrogen. The H$^+$ and H$^-$ species constitute specific hydrogen electrodes (H$^+$ +2e$^-$→H$^-$ and H$^-$→H$^+$ +2e$^-$) which differ from the standard hydrogen electrode (2H$^+$ +2e$^-$→H$_2$). Hydride ions may be transported in accordance with a relay mechanism in which weakly bound electrons jump from one proton to another. A similar relay mechanism has been described for the transport of hydronium ions H$_3$O$^+$ in electric fields. Depending on the transportation mode, the transformations at the cathodic sites shown in FIGS. 1 and 3 may be spatially separated, or may occur at the sacrificial metal surface.

At the initiation or spontaneous induction of cementation, an electrical double layer is formed at cathodic sites. The outer Helmholtz layer is comprised of hydrogen ions, noble cations, and indifferent ions such as Na$^+$. As a result of the interaction between hydrogen ions and electrons, hydride ions are emitted from cathodic sites, while noble ions diffuse from the bulk solution towards the cathodic sites. Thus, two opposite fluxes are formed: a hydride flux and a counterflux of noble ions. The species in these fluxes react with each other (H$^-$ +Me$^{2+}$→H$^+$ +Me).

At the onset of the cementation process, either the hydride flux or the noble cation flux is greater. In the former case, the reaction between ions in these fluxes results in the disappearance of noble ions from the layer adjacent to the cathodic sites and the reaction front moves to a distance δ from the cathodic sites where these fluxes are equal (see FIGS. 1 and 4$b$). In this case, electrodes A$_g$ and C$_e$ would form at the reaction front. The initial potential determining processes at these electrodes and at the cathodic sites C$_g$ are shown in FIG. 1. The hydrogen ions recovered at the electrode A$_g$ create a flow across the δ$_g$ layer and counterfluxes of H$^+$ and H$^-$ ions in this layer create an electrical current, thus constituting the migrational transport of species at cathodic sites.

In the latter case, in which the diffusion flux of noble species is greater than the flux of hydride, the reaction front is shifted towards the cathodic sites. Transitional regimes between these two situations are theoretically possible when initial hydride and noble ions fluxes are nearly equal; however, such regimes are not likely to be stable.

The main reactions at electrodes C$_g$ and A$_g$ are H$^+$ +2e$^-$→H$^-$ and H$^-$→H$^+$ +2e$^-$, respectively. The equilibrium potentials (volts) that are thermodynamically possible at these electrodes are given by $E = -1.125 + RT/2F \ln[H^+]/[H^-]$. Because the same species, hydrogen and hydride ions, constitute both cathode C$_g$ and anode A$_g$, the galvanic cell is a concentration element. Additionally, hydrogen ions disappear at C$_g$, while hydride ions completely disappear because of fast electrode reactions at A$_g$.

2. Statics of the Migrational Transport Layer

Although the cementation process is essentially dynamic, a discussion of the statics of the process is necessary to establish a framework to describe the process dynamics. First, Ohm's law can be applied to the electric current within the δ$_g$ layer, giving rise to a potential gradient. Under the influence of this potential gradient, cationic species that approach the electrode A$_g$ by convection in the bulk solution will be pumped into the migration layer (δ$_g$), whereas anionic species will be pumped out of this layer (with the exception of noble and hydrogen species which disappear at the A$_g$ electrode).

Under this pumping effect, an accumulation of hydrogen, H$^+$, and indifferent cations such as Na$^+$ occurs in the layer δ$_g$. Accordingly, a considerable concentration gradient and diffusional backflow of these ions takes place, and, therefore, the velocity of hydrogen ions in the electrical field decreases. In contrast, hydride (or relayed electrons) will be pumped out of the δ$_g$ layer under the influence of both the electrical forces and diffusional phenomena. A graphic presentation of relative potentials and distributions of ionic species in the galvanic cell for a static case is given in FIG. 4. Solid lines in FIG. 4 are related to a single noble specie, while broken lines illustrate the effects of multiple (two) noble species; δ and δ' refer to the distance of the reaction front edge of the migrational layer δ$_g$ from cathodes C$_g$ when a single noble specie and multiple noble species are present, respectively. DL refers to the electrical double layer present at the electrodes.

Indifferent cations I+ do not take part in the electrode reactions in the galvanic cell. Accordingly, they accumulate within the galvanic cell and are distributed across the cell as shown in FIG. 4$c$; these ions migrate towards the electrode C$_g$ under the force of the electric field and flow back because of diffusional effects. These phenomena, and the resulting distribution of ions, are analogous to the sedimentation-diffusion equilibrium for colloidal particles in liquids. A small quantity of indifferent ions diffuses out from the δ$_g$ layer. The resultant gradual drop in concentration of indifferent ions at the outer border of the δ$_g$ layer is also shown in FIG. 4$c$.

The distribution of hydrogen ions (FIG. 4$d$) is similar to that of indifferent ions. However, because H$_3$O$^+$ possesses an exceptionally high electric mobility and, thus, a higher ratio of electric to diffusional forces, the distribution of hydrogen pumped into the δ$_g$ layer is characterized by a steeper curve, reflecting a greater proportion of hydrogen ions as compared to indifferent ions in the vicinity of electrodes C$_g$. As with indifferent ions, hydrogen ions leak out of the δ$_g$ layer because of diffusion. In contrast to indifferent ions, however, hydrogen ions react at the electrode C$_g$ to form hydride ions.

Hydride ions (or electrons originating from hydride ions) are ejected from the electrode C$_g$ and are further repulsed from the δ$_g$ layer under electrostatic forces as shown in FIG. 4$e$. Anions (FIG. 4$f$) are also pumped out of the δ$_g$ layer.

When two or more different noble ions are used, a synergistic effect on the process rate may occur. Such an effect can be attributed to the following three factors: different reduction potentials, different diffusivity, and different ion charge (either plus or minus). These three factors effect the individual thickness of the $\delta_g$ layer for a given noble specie. An analogous phenomenon was described by Levich in *Physicochemical Hydrodynamics*, Prentice Hall, 1962, in relation to diffusion in various mass transfer processes. FIG. 4 illustrates the distributions of potentials and concentrations of reacting and indifferent species for two noble species (broken and solid lines). The width of the migration layers for these species are $\delta'_g$ and $\delta_g$, respectively. It follows from FIG. 4 that the potentials and concentrations at point $\delta'$ change stepwise and the average potential gradient becomes steeper when two noble species are reduced as compared to a single specie. Accordingly, both species may be reduced faster than either of them taken individually. A combination of noble species can be used to induce, accelerate, or reinduce the migrational cementation regime. Some noble species, particularly negatively charged ions such as $Cr_2O_7^{2-}$ or reducible electrically neutral species, may be used as promoters of the migrational cementation regime.

Considering the effect of cations being pumped into and anions pumped out of the $\delta_g$ layer, the electrolyte within the galvanic cell is positively charged. However, the bulk solution remains electroneutral. For the overall system to remain electroneutral, therefore, a quantity of anions equivalent to the excess hydrogen and indifferent cations accumulated in the galvanic cell must accumulate at anodic sites $A_e$. These accumulated anions "push" and the hydrogen and indifferent cations "pull" the electrons in the sacrificial metal, giving rise to the so-called push-pull mechanism.

Anions are electrostatically attracted to the anodic sites $A_e$ and diffuse in the opposite direction. Cations at anodic sites, including those that originated from the dissolution of the sacrificial metal, are repulsed from the anodic sites under the action of electrostatic forces. The distributions of anions and cations at anodic sites are illustrated in FIGS. 5a and 5b.

Once established, the reservoirs of positive and negative charges at the cathodic and anodic sites, respectively, will not change substantially during the course of the process because of a mutual attraction through the body of a metal. Thus, a virtually constant push-pull tension and a virtually constant potential difference, averaged over long time intervals, is created. Slow relaxation of these charge reservoirs may occur from the diffusional leakage of anions and cations from boundary layers at anodes and cathodes, respectively. For example, such leakage may occur when the jump in the electric potential at the outer border of the $\delta_g$ layer decreases upon the depletion of noble species in a batch process.

The electric current in the system flows from the electrode $A_e$ to the electrode $C_g$ (flow of electrons), from $C_g$ to $A_g$ (flow of hydride ions, or electrons, and electrical-diffusional motion of hydrogen and indifferent ions), from $A_g$ to $C_e$ (electrons), and from $C_e$ to $A_e$ (current in a binary electrolyte in the bulk solution, electrical-diffusional flow of anions, and predominantly electrical flow of sacrificial cations in the boundary layer at anodic sites). Electrodes $A_e$ and $C_g$, as well as $A_g$ and $C_e$, are short-circuited by the sacrificial metal and the primary particles respectively. Accordingly, these pairs of electrodes have the same potentials a and b as shown in FIG. 6, which illustrates an instantaneous potential-current diagram for the migrational cementation regime. The diagram is a plot of log i versus E, in which $i_a$ and $i_c$ are anodic and cathodic currents, respectively, and E is the potential. Evaluation of the magnitude of the potential difference, $U = a - b$, across the $\delta_g$ layer and across the bulk solution and the boundary layer at anodic sites will be given later. The value of U reflects the magnitude of the tension produced through the push-pull effect.

Anodic and cathodic sites arise because of defects in the lattice structure on the surface of sacrificial metal. When a single pair of anodic-cathodic sites occurs, it induces multiple sites on the entire surface of the sacrificial metal exposed to the electrolyte. Moreover, the electrical fields in all pairs of cells are basically identical. For example, a sacrificial metal may be a clump of twisted wire. The electrical cells inside and outside the clump will have similar characteristics. However, the fields developed at sharp edges will be stronger.

Electrical cells will also be induced across a membrane having a cementation electrolyte on one side and an electrolyte lacking noble species on the other side. Processes other than the reduction of a noble species may be performed on the "opposite" side of the membrane. Sacrificial metal can be attached to a more noble metal, which becomes polarized cathodically. Thus, galvanic cells are induced on the surface of the more noble metal.

The positive charge within the $\delta_g$ layer caused by hydrogen ions is not conserved because hydrogen ions take part in electrode reactions and disappear from this layer. For example, $H^+$ reacts to form molecular hydrogen when noble ions become depleted. Accordingly, the relaxation of the positive charges, and thus the negative charges, would occur rapidly. However, this relaxation can be slowed when indifferent ions are present in the electrolyte because they constitute a fraction of the positive charge in the $\delta_g$ layer. Moreover, when hydrogen ions disappear from the $\delta_g$ layer, they are substituted by indifferent ions. Thus, two properties of indifferent ions are important: electrical mobility and diffusivitiy. An optimal relationship between mobility and diffusivity can be achieved by using a mixture of various indifferent ions such as $Li^+, Na^+, K^+$, etc.

3. Dynamics of the Process

The migrational layer $\delta_g$ and the layer at anodic sites can be analogized to capacitors. Considering that reduction of noble species and oxidation of sacrificial metal result in the production of electrical energy, the electrochemical system comprised of anodes $A_e$, cathodes $C_e$, and the associated electrolyte can be considered as a generator of electricity. It is also suggested herein that the electric current across the $\delta_g$ layer occurs in repeated pulses, each pulse similar to a break down current in a capacitor. This current is triggered by the accumulation of electric charges in the capacitor and the subsequent deformation in the distribution of cations in the $\delta_g$ layer. During flow of the break down current, the $\delta_g$ layer can be considered as an inductance. After each pulse, the distribution of cations within the $\delta_g$ layer becomes more uniform and the layer becomes a capacitor again. The overall system also has some active resistances.

Figure 7:
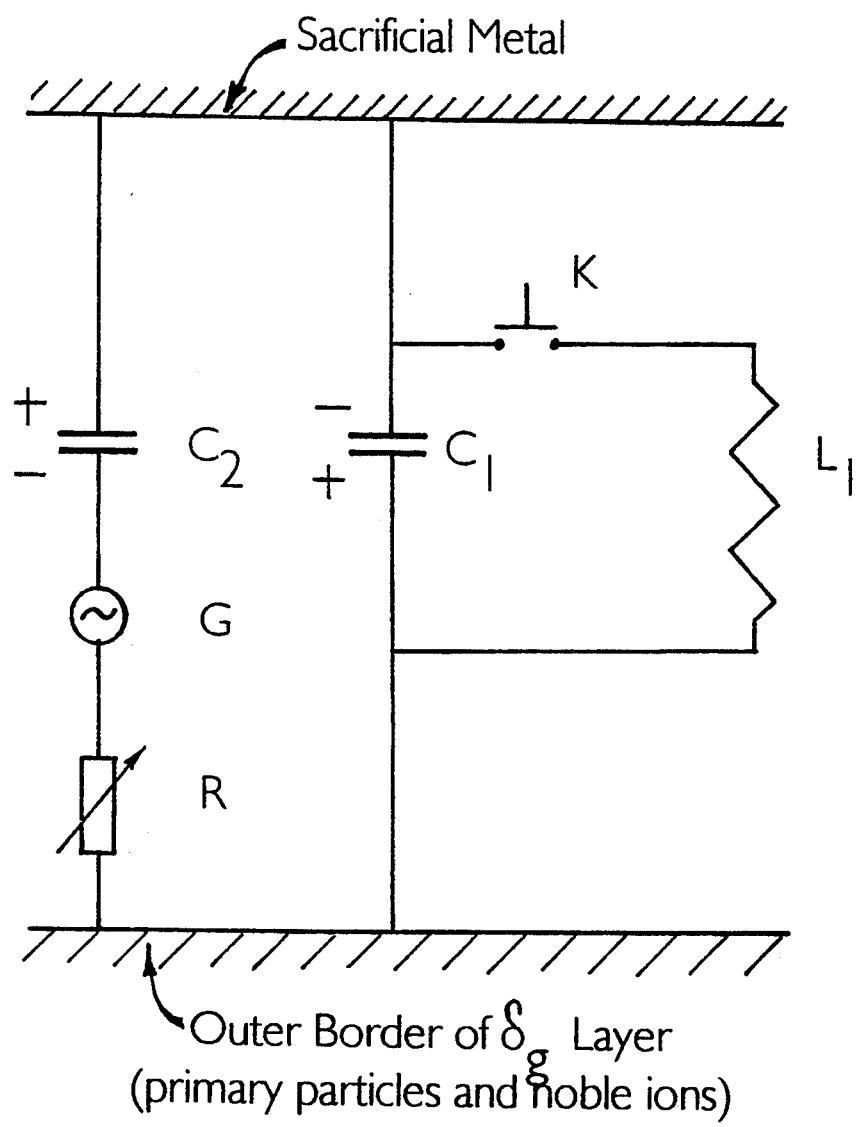
FIG. 7 is an equivalent electric circuit of cementation processes.

FIG. 7 shows an equivalent electrical circuit which reflects a number of major processes in the overall system. In FIG. 7, capacitor $C_1$ corresponds to the $\delta_g$ layer, $L_1$ is the inductance, K is a trigger, R is an active resistance, G is a generator and $C_2$ is a capacitor at the anode $A_e$. The sacrificial metal and the outer border of the $\delta_g$ layer are electric conductors.

The plates of the capacitor $C_1$ are formed by cathodes $C_g$ and the outer border of the $\delta_g$ layer containing primary particles and noble species. Aqueous indifferent cations and hydrogen ions constitute a specific dielectric between plates. The polarization of such a dielectric is determined by the balance of electrostatic and diffusional forces acting upon these cations. The electrostatic forces provide order, while diffusional forces produce disorder in the dielectric. Taken over a short period of time (the duration of the charging period), mobile cations prevent the break down of the capacitor $C_1$ and, thus, substantial charges and a voltage differential arise in the capacitor $C_1$.

The capacitor becomes charged by the above-described pumping and push-pull mechanisms. When the potential difference between the capacitor's plates reaches the break down voltage, electric current flows between the plates. The break down current occurs in the form of short-lived streamers, forming a tunnel of positively charged particles that are present in the $\delta_g$ layer because of the pumping and push-pull effects (indifferent and hydrogen cations) with negative particles (electrons that originated from hydride ions) forming the core of the streamer. Because streamers are short-lived, the break down current changes very rapidly. Accordingly, this current induces very strong electromagnetic fields and the streamers can be considered as inductance $L_1$ in the overall electric circuit.

Streamer formation is facilitated by the non-uniformity of the electric field in the $\delta_g$ layer (capacitor $C_1$). This non-uniformity, in turn, can be attributed to rough deposits of noble metal on the surface of cathodic sites $C_g$ and discontinuities in the outer border of the $\delta_g$ layer where discrete minute primary particles and noble ions are located. The electric field is strongest between deposit protrusions and the discrete points in the outer border of the $\delta_g$ layer. Accordingly, cations migrate towards a line connecting these protrusions and discrete points, forming the streamer's shell and attracting electrons into the core of the streamer. Once a streamer is formed (corresponding to closing the trigger K in FIG. 7), a rapidly changing pulsed current occurs. This current produces a strong electromagnetic field, which causes the cross-section (diameter) of the streamer to contract and, thus, the streamer's body becomes momentarily separated from the surrounding water. Accordingly, the plasma in the streamer is in a vacuum and, therefore, no energy is lost to the surrounding media on the sidewall (shell) of the streamer.

In the electric field in the specific dielectric within the $\delta_g$ layer, electrons and cations are accelerated; electrons move towards the outer border of the $\delta_g$ layer, while cations move towards cathodes $C_g$. A relay motion of electrons surrounded by cations of hydrogen in streamers occurs from cation to cation and the overall electron motion can be considered as equivalent to the transport of hydride ions originally formed at cathodes $C_g$. Electrons react with noble species at the outer border of the $\delta_g$ layer.

When trigger K is on (break down of capacitor $C_1$) and rapidly varying electric current is flowing through inductance $L_1$, a strong electromagnetic field is induced, resulting in a current that charges the capacitor $C_2$. Physically, this corresponds to pushing electrons from and attracting anions to the anodic sites $A_e$.

After capacitor $C_1$ is discharged, the current through inductance $L_1$ is interrupted, which corresponds to trigger K being turned off. The capacitor $C_1$ then becomes charged from capacitor $C_2$ and the cycle is repeated.

This electric circuit is a typical resonant circuit, which produces resonances in the electric tension and currents. Considering that the losses caused by the active resistance are completely compensated by the energy generated in the electrochemical processes and the frequency of the energy generator G completely coincides with the natural frequency of the resonant circuit, amplification of the electric tension and the electric currents must be very large.

Referring to FIG. 6, the value of potential difference U can be considered as the potential difference induced in the resonant circuit. Considering the process dynamics, the phases of U for capacitors $C_2$ and $C_1$ (or inductance $L_1$) are opposite, while the phase of the electric current and the tension for inductance $L_1$ (capacitor $C_1$) are slightly shifted. The discharge in the galvanic cell becomes a high-voltage, high-current pulsed discharge and, therefore, a high power discharge. The magnitude of the voltage difference U can be estimated as shown below: The width of the $\delta_g$ layer can be estimated using Levich's formula $$\delta_g = x^{\frac{1}{2}} \nu^{1/6} D_a^{\frac{1}{3}} v^{-\frac{1}{2}}$$

where $\nu$ is the water viscosity, $D_a$ is the coefficient of diffusion of ions in water, v is the water velocity relative to electrodes, x is the distance along the speed vector ($x \approx 1$mm). Taking the values of $\nu = 10^{-2}$ cm$^2$/s, $D_a = 10^{-5}$ cm$^2$/s, $v = 10^2$ cm/s, and $x = 10^{-1}$ cm, the value of $\delta_g = 3 \cdot 10^{-4}$cm. Considering that the surface layer of the cathodes is saturated with hydride ions, or the density of hydride is about $10^{23}$ ions/cm$^3$, and taking the thickness of the saturated layer of $10^{-2}$cm, the density of the electric charge at the cathode is $Q = 0.8 \cdot 10^{-2}$ C/m$^2$. The intensity of the electric field is defined as $$E = Q/\epsilon \cdot \epsilon_0$$

where $\epsilon$ is the dielectric permittivity of water ($\epsilon = 80$) and $\epsilon_0$ is the free space permittivity. Accordingly, $E = 10^5$ V/sm. For the value of $\delta_g = 3 \cdot 10^{-4}$cm, the voltage difference across the $\delta_g$ layer is 30 V.

Referring to FIGS. 4, 5, and 6, the distribution of species and potentials, as well as the electrode currents, should be taken as instantaneous pictures of a dynamic process. All these values change very rapidly. Moreover, the phases of these changes are either opposite or slightly shifted as described above.

Thus, in accordance with the description presented herein, the essential element of the method includes the induction of the migrational layer $\delta_g$, within which H$^+$ and H$^-$ ions and electrons originating from H$^-$ are accelerated in a very strong local electrical field. As previously described, such a layer can be induced in cementation systems. Induction of such a layer can be further promoted by the use of promoters, such as negatively charged reducible noble ions (for example, $Cr_2O_7^{2-}$). The essential reasons for the induction of migrational layer are (1) the availability of electron acceptors at the outer bondary, and (2) a very high current density over the cathodic area.

In addition, the cathodic area can be increased by using a cathode composed of a metal more noble than the sacrificial metal such that these two metals are connected and attached to each other and submerged in a solution of a noble metal salt. A further modification includes electrically connecting the sacrificial and noble metals and submerging them in separate vessels; the sacrificial metal is submerged in a solution in which it becomes anodically dissolved (for example, an acid), while the more noble cathodic metal is submerged in a solution of a salt of a noble metal. Metals included in this salt should not necessarily be the same metal as the cathodic metal. For example, the sacrificial metal can be zinc, the noble cathodic metal may be platinum, and the noble metal of a dissolved salt may be copper. Other combinations of metals are also possible.

Also, a cathodic noble metal can form a membrane that separates the vessel (or compartment) for dissolving the sacrificial metal from the vessel (or compartment) for the cementation of the noble metal contained in the dissolved salt onto the cathodic noble metal. Moreover, the membrane may also be made of the sacrificial metal. If so, however, the sacrificial metal membrane would eventually dissolve. When heavy water is used in the vessel (or the compartment) containing the solution of the noble metal salt, the nuclear reactions listed above would also take place.

Alternatively, the migrational layer $\delta_g$, with all properties as described above for cementation systems, can be induced by applying high current densities in electrolytic baths operated at moderate mixing levels and low to moderate concentrations of noble metals (or metals being plated). For example, in electrolytic baths for plating (or refining) various metals, powdery metals are sometimes formed. The regimes at which powdery metals are formed correspond to the induction of the migrational layer at localized cathode areas. The induction of such localized areas is encouraged by the use of rough cathodes. Accordingly, the use of cathodes formed from mesh and various ridge, valley, and other shapes having protrusions promotes the induction of localized migrational zones at the cathode surface.

A process in a reactor with electrodes to which a pulsed current is applied from an external source can be used. In this process, the pulsed current induces the migrational layer and, thus, emulates the cementation process. Pulsed current should provide a very high cathodic current density as required for the migrational regime.

The effectiveness and the rate of cementation processes in migrational regimes, whether induced by cementation or by applying high current densities, depend upon the magnitude and the density of hydride-hydrogen fluxes in the $\delta_g$ layer; greater hydride-hydrogen fluxes result in greater cementation rates. As described previously, hydrogen and hydride ion fluxes are induced to match (to equal approximately) the original diffusional flux of noble species that occurs at the time the migrational layer is induced. An optimal concentration of noble species can be used at the induction period only to produce the maximal hydrogen-hydride fluxes. Thereafter, a lower, or greater, concentration of noble ions would not change the fluxes and the maximum process rate could be maintained for a substantial period of time. Periodically, reinduction of optimum fluxes may be needed because of relaxation processes. Such reinduction can be performed by using hollow, perforated, or porous electrodes (such as those made by the use of metal powder fusing) with periodic injection of a noble salt solution having an optimal concentration of noble metals.

Alternatively, the process rate may be increased by employing fluidized electrodes made of sacrificial metal particles, chemically neutral particles such as gold or platinum, or particles of the same metal as the noble cations, for example, copper, silver, etc. In the latter case, particles formed in cementation processes (cement powders) are preferred. Chemically neutral particles and particles of the same metal as the noble cations can be added to either a cementation system or to an electrically driven system.

A combination of a cementation and electrically driven process can also be possible in which the migrational layer is induced by a cementation mechanism followed by cathodic polarization of the sacrificial metal, thus making the sacrificial metal behave as a more noble metal. In this process, consumption of sacrificial metal would be reduced. Additionally, the optimal concentration of the noble metal species can be provided only during the induction period, reducing the consumption of noble metal salts.

A reducing atmosphere eliminates the retarding effect of oxygen at the cathodic sites, in which oxygen oxidizes hydrogen ions and reduces the effective flux of hydrogen species. A reducing atmosphere can be provided by bubbling $H_2$ gas into the electrolyte. The use of a neutral atmosphere, such as $N_2$ gas, also reduces the negative effect of oxygen.

The sacrificial metal or electrodes can be formed from Zn, Mg, Ca, Al, Fe, Ni, Co, and other inexpensive or moderately expensive metals or alloys.

4. Control Variables

The cementation rate in the migrational regime can be controlled by an appropriate selection of noble species, singly or in mixtures; optimal concentrations of noble species, singly or in mixtures; optimal pH; optimal selection of indifferent ions, singly or in mixtures; optimal concentrations of indifferent ions, singly or in mixtures; optimal selection of anions, singly or in mixtures; optimal concentrations of anions, singly or in mixtures; optimal selection and concentrations of complexing agents; optimal mixing rate; a reducing atmosphere; and an optimal temperature. The effects associated with these factors are discussed above and in Khudenko, "Mathematical Models of Cementation Processes," *Proc. Env. Eng. Div., Amer. Soc. Civil Eng.*, 113:681–701 (1987); Gould et al., "Examination of the Zinc Cementation of Cadmium in Aqueous Solutions," *Water Science and Tech.*, Vol. 19, Rio (1987); and Khudenko et al., "Specifics of Cementation Processes for Metals Removal," *Proc. of the 5th Int. Conf. on Advanced Wastewater Treatment and Reclamational IAWPRC*, Vol. 2, Cracow, Poland, (1989). As discussed above, external sources of electricity, or their combination with cementation processes, can be used to control the process.

5. Preferred Embodiments

The following embodiments illustrate various aspects of the invention, but are in no way intended to limit the scope thereof. Like reference numbers refer to like parts in the various Figures.

Figure 8:
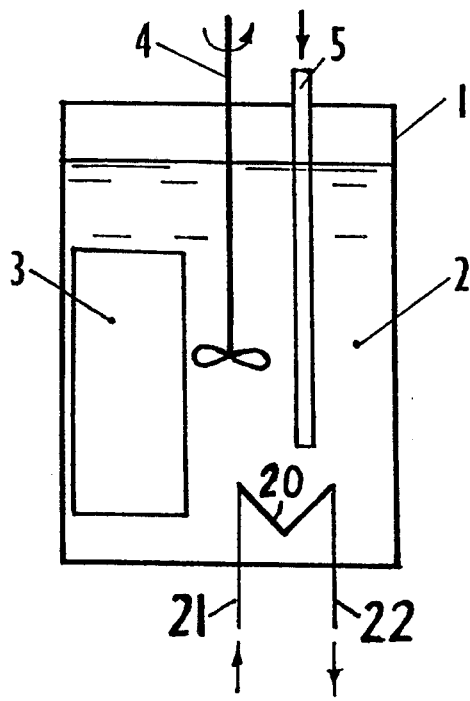
FIG. 8 is a cross-section of a batch reactor for cementation induced processing of materials.

FIG. 8 shows a batch reactor for cementation-induced processing of materials. The reactor consists of a vessel 1 that is periodically filled with electrolyte 2, which contains the material to be treated, noble ions, optionally acid or alkali for optimum pH, and also, optionally, promoters of the migrational regime; a sacrificial metal 3 submerged in electrolyte 2; an optional mixing means 4, for example, a propeller mixer; and also optional means 5 for feeding reducing ($H_2$) or neutral ($N_2$) gases.

Upon contact of the sacrificial metal 3 with the electrolyte 2, noble ions become reduced and anodic and cathodic sites are formed on the surface of the sacrificial metal 3. Upon adjustment of pH, noble ion concentration, mixing rate, and atmosphere, the migrational regime is induced. The material to be treated is brought by convection to the surface of the sacrificial metal 3 and undergoes the prescribed treatment, such as oxidation-reduction, coagulation, etc. Upon completion of the treatment, the batch of the electrolyte is discharged. Periodically, the sacrificial metal is also changed for new material.

Figure 9:
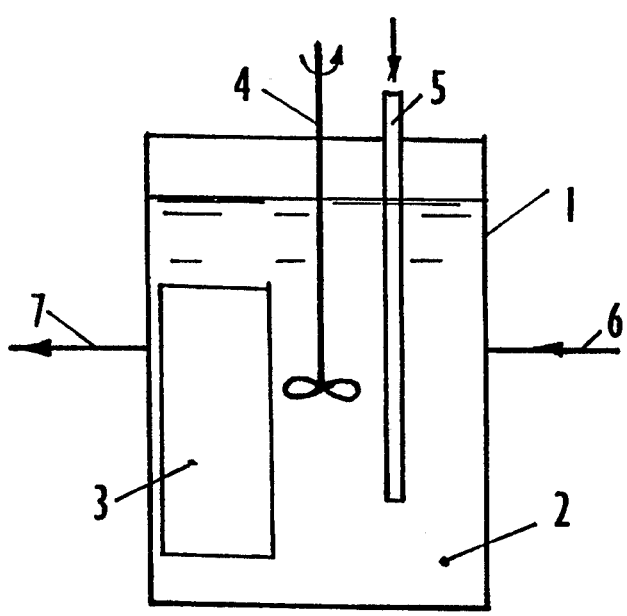
FIG. 9 is a cross-section of a flow through reactor for cementation induced processing of materials.

FIG. 9 shows a flow-through reactor for cementation-induced treatment of materials. In addition to the elements provided in the apparatus shown in FIG. 8, flow-through input conduit means 6 and output conduit means 7 are provided for feeding the fresh electrolyte, containing the material to be treated, and for discharging the electrolyte with treated material, respectively. Other modifications can provide for a plug-flow or multiple steps reactor and separate feed conduits for the electrolyte, the noble ion solution, and the solution containing the material to be treated.

Figure 10:
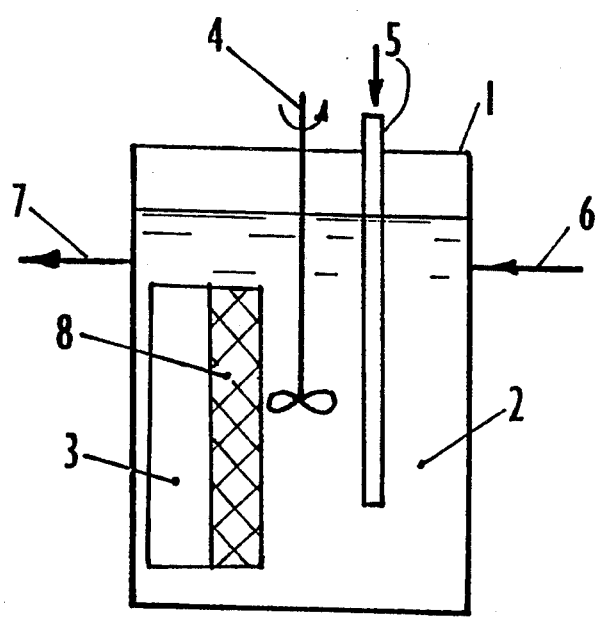
FIG. 10 is a cross-section of a cementation reactor for processing of materials with a composite electrode made of interconnected sacrificial metal and a noble cathodic metal.

FIG. 10 shows a reactor for the cementation-induced processing of materials in which the reactor employs a composite electrode system consisting of sacrificial metal 3 connected to noble cathodic metal 8. The cathodic metal 8 should be comprised of the same metal as the noble ion in electrolyte 2 or a more electropositive metal. Such an arrangement provides for an increase in the cathodic surface area and, consequently, the process rate.

FIG. 11 shows a flow-through noble metal cathode, which consists of a porous or otherwise liquid permeable (for example, perforated) body 9, within which a cavity 10 is provided. Conduits 11 and 12 are provided for feeding the optimal composition solution containing noble ions into the cavity 10 for inducing the migrational regime of cementation and for flushing the internal cavity of the electrode from accumulated deposits. Porous electrode 9 is attached to the sacrificial metal 3, such as shown in FIG. 10. Both are submerged into reactor vessel 1 that contains an electrolyte that does not contain noble metal ions. A solution of another electrolyte containing such noble ions is fed periodically or continuously into the cavity 10 via conduit 11. This solution passes through porous walls 9 of the electrode and exits into the reactor. In the presence of noble ions, the cementation regime and, subsequently, the required processing of materials are induced. Cemented deposits can be formed inside the electrode. Such deposits are periodically flushed out via conduit 12.

FIG. 12 shows an alternative embodiment of a cementation-induced apparatus for processing materials in which the reactor vessel 1 consists of two compartments 1a and 1b for cementation (1a) and material processing (1b), respectively. These compartments are separated by a wall or a membrane 13. A noble metal cathode 8, which is submerged in compartment 1a, is connected by conductor 14 to a sacrificial metal 3 submerged in the cementation electrolyte in compartment 1b. Compartment 1a is filled with the solution to be processed and, optionally, noble metal ions. A cementation reaction is induced at the surface of the sacrificial metal 3 in compartment 1b; through conductor 14, the noble metal cathode 8 becomes polarized and the cementation-induced processing of materials is initiated in compartment 1a. Optional addition of noble ions in the compartment 1b can increase the process rate. Optionally, membrane 13 can be made of the noble metal and serve instead as the electrode 8. In this case, conductor 14 should be attached to membrane 13.

FIG. 13 illustrates yet another alternative of the preferred embodiment. This embodiment consists of a reactor vessel 1, which holds noble metal ion containing electrolyte solution 2 that is at an optimal pH; input and output conduit means 6 and 7 for providing flow-through of the electrolyte solution; and cathode 15 and anode 16 connected to a source of electric current 19 by means of conductors 17 and 18. Optionally, cathode 15 can be a flow-through cathode as shown in in FIG. 11 and previously described. In this case, electrolyte 2 does not necessarily contain noble ions; noble ions are provided by feeding a cementation-inducing solution through conduit 11 into the porous electrode and deposits from the internal cavity of the electrode are withdrawn through conduit 12. This embodiment can operate in at least three modes: (1) high current density operation with and without noble metal ions being added to the electrolyte; (2) operation with electric current applied to the electrodes and induction/periodic reinduction of the migrational cementation regime through use of porous electrode 11; and (3) induction and maintenance of the migrational regime through use of a partially rectified current.

In the first operational mode, the migrational regime is induced by use of a high current density, which is provided by a high current applied to the total electrode surface. This effect is further amplified by use of electrodes with rough surfaces, which promote very high localized current densities. The migrational regime is further intensified if noble metal ions are present in electrolyte 2. The migrational regime at cathode 15 induces the necessary material processing at this electrode.

In the second operational alternative, a solution containing noble ions is periodically or continuously fed through electrode 15, which is, optionally, made permeable for this operational option, thus inducing a migrational regime at the electrode.

In the third operational regime, alternate current is rectified to produce a sequence of positive pulses of current followed by at least a single counterpulse (negative). Counterpulsing depolarizes the cathode and establishes the boundary layer such as found in the migrational cementation regime. This operational regime can be further improved by adding noble ions to the electrolyte 2, as well as by the use of high current densities.

Yet another modification of this process may be provided by converting energy source 19 of FIG. 13 into a sink of energy, for example, a heating element or a recharging storage battery. In this case, electrodes 15 and 16 will form a galvanic element such that electrodes 15 (soluble) and 16 will be an anode and cathode, respectively. Current will flow between these electrodes via conductors 17 and 18 and energy sink 19. This reduces the voltage difference between electrodes 15 and 16 and their polarization. This control over polarization can be helpful to optimize reactions occurring during the course of processing specific materials.

FIG. 14 shows an embodiment in which a fluidized electrode cementation process is used. The process is performed in a reactor vessel 1, fed with electrolyte 2 through flow-through input conduit means 6 located on the bottom of vessel 1. Electrolyte 2 is removed at the top of the vessel 1 via flow-through output conduit means 7. A heat exchanger 20, with input and discharge conduits 21 and 22 respectively, is submerged in electrolyte 2. Electrolyte 2 is preferably recycled. The reactor vessel 1 is charged with particles of a sacrificial metal 26 (optionally, more noble metal particles 27 can also be added). In the course of operation, the migrational regime of cementation is induced at suspended sacrificial particles 26, thus inducing the desired processing of materials. Further improvement in the process can be achieved by adding more noble metal particles 27, which increase the effective cathodic area of the fluidized electrode and, therefore, increase the overall process rate. Noble metal particles can also be previously cemented materials.

Figure 15:
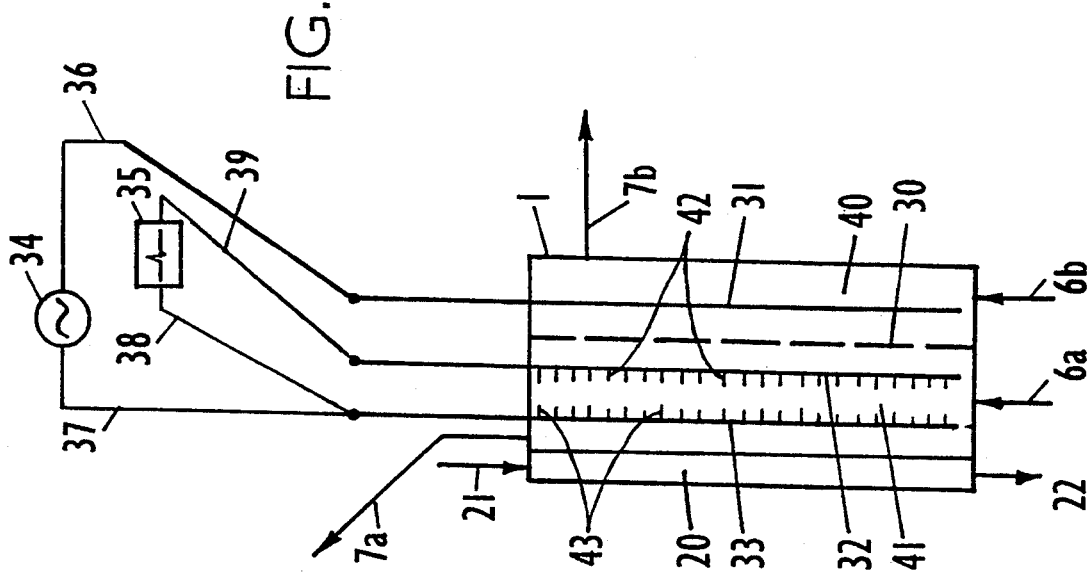
FIG. 15 is a cross-section of a membrane reactor for the electrochemically driven processing of materials.

FIG. 15 illustrates an embodiment in which the reactor vessel 1 is compartmentalized by a membrane and multiple electrodes and external sources of energy are employed. Reactor vessel 1 is separated by permeable membrane 30 into anolytic 40 and catholytic 41 compartments. In catholytic compartment 41, cathode 33 and an anode 32 are submerged in an electrolyte, whereas an additional anode 31 is submerged in the electrolyte in the anolytic compartment. A source of polarization current 34, preferably direct current, is connected by leads 37 and 36 to electrodes 33 and 31, respectively. A source of a pulsed current 35 is connected by leads 38 and 39 to electrodes 33 and 32, respectively. A heat exchanger 20 is attached to the body of the reactor vessel 1 and the heat carrier is fed through conduit 21 and discharged through conduit 22. For continuous operation, either the electrolyte flow-through input conduit means 6a and/or 6b and electrolyte flow-through output conduit means 7a and/or 7b are provided. Membrane 30 may be either an electroneutral porous membrane or an ion exchange (permeable to anions) membrane. In the case in which flow-through input conduit means 6b is employed, a cation exchange membrane should be used.

Still referring to FIG. 15, an electrolyte, as previously described, is fed into either compartment 40 via conduit 6b or compartment 41 through conduit 6a. Under the action of the direct current from electrical source 34, cations (noble, if any, hydrogen, and indifferent cations) concentrate in compartment 41, while anions accumulate in compartment 40. Under the action of the pulsed current from source 35, the electric gap between electrodes 32 and 33 periodically breaks down and reactions effecting the material processing occur. The heat exchanger 20 provides means to optimize the process temperature.

The system of compartments 40, 41 and heat exchanger 20, with membrane 30 and electrodes 31, 32, and 33 can be considered as a single cell; a total reactor can be comprised of multiple cells assembled in a reactor unit similarly to an electrodializer apparatus or a multiple plate filter press. Such a reactor unit may be provided with one or several sources of electric currents 34 and 35.

Electrodes 32 and 33 may be comprised of flat plates or be provided with multiple filaments 42 and 43, respectively. The filaments 42, 43 protrude from the surface of the electrodes such that filaments on each electrode are separated by small gaps and face filaments on the other electrode, as shown in FIG. 15, so that electric discharge occurs between the filaments 42 and 43. Fluidized metallic particles may also be introduced between electrodes 32 and 33 in order to facilitate the discharge current between these electrodes. Sources of pulsed currents are described by Frolkin and Popov in "Pulse Circuits", Mir Publishers, Moscow, 1986, and by Pentegov in "Fundamentals Of Charging Circuits For Energy Accumulators With Capacitors", Publishing House "Naukova Dumka", Kiev, 1982.

Figure 16:
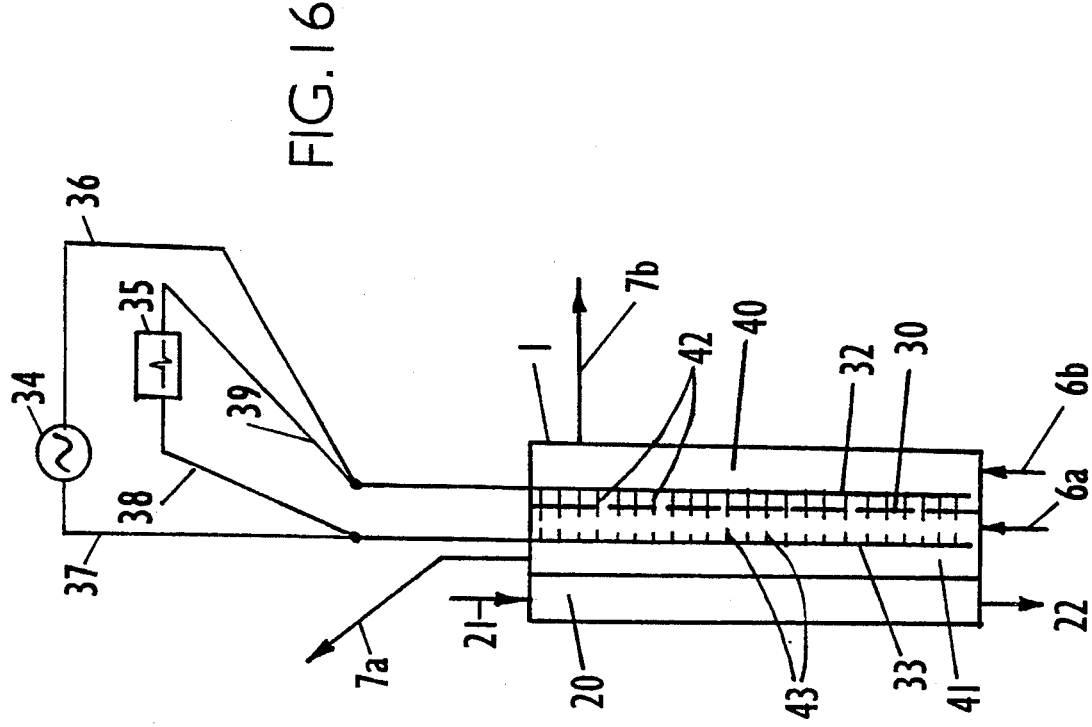
FIG. 16 is a cross-section of an alternative embodiment of a membrane reactor for the electrochemically driven processing of materials.

FIG. 16 shows an alternative embodiment of a reactor compartmentalized by a membrane. This system is comprised of a reactor vessel 1 with a permeable membrane 30 (either electroneutral or ion exchange); anode 32 located in compartment 40 and having filaments 42 penetrating across membrane 30; cathode 33 with optional filaments 43; a source of polarization current 34, preferably direct current, connected to electrodes 32 and 33 by leads 36 and 37, respectively; and a source of a pulsed current 35 connected to electrodes 32 and 33 by leads 38 and 39, respectively. Similarly to the embodiment shown in FIG. 15, electrolyte flow-through input conduit means 6a and/or 6b and flow-through output conduit means 7a and/or 7b are provided. A heat exchanger 20, with conduits 21 and 22 for heat carrier transport, is attached to the wall of the reactor vessel 1.

Electrode 32 preferably should be made permeable, for example, as a perforated plate or a wire mesh. A small gap has to be provided between the filaments of the electrode 32 and the plate or filaments of the electrode 33. Cells comprised of compartments 40, 41 and heat exchanger 20 can be assembled in a multiple cell reactor vessel. The wall between the compartment 41 and the heat exchanger 20 can be used as an electrode 33.

The embodiments exemplified in FIGS. 15 and 16 are operated in the same manner, with the difference being only in the arrangement of anodes: single anode 32 with filaments 42 penetrating across membrane 30 in FIG. 16 versus two anodes 31 and 32 located on both sides of membrane 30 in FIG. 15.

In all described embodiments, inexpensive sacrificial metals, such as Zn, Mg, Ca, Al, Fe, etc. can be used. Fe, Ni, Cd, Cu, Ag can be used as noble metal for cathodes. Noble metal ions can be obtained from ions of Cu, Pb, Hg, Ag, etc. or mixtures of these ions can be selected. The sacrificial metal should always be more electronegative than the noble metal cathodes while the nobility of the noble metal ions should be equal to or greater than that of the noble metal for cathodes. Reducible metal containing anions, for example $Cr_2O_7^{2-}$ or others, preferably should be used as additional promoters for inducing a migrational regime at cathodes.

6. Examples

Several tests have been conducted in order to evaluate the technical feasibility of the cementation-induced treatment method. An additional objective of this testing was to discover the principal differences in efficiencies between the cementation-induced and metal reduction of organics. A brief description of the preliminary tests is as follows:

EXAMPLE 1

A saturated aqueous solution of direct yellow 12 was diluted by a factor of 4 and acidified by $H_2SO_4$ to pH=4.5. $Cu^{2+}$ was added to bring the solution to a concentration of 100 mg/L of $Cu^{2+}$, the suspension formed was filtered, iron wire 2 m in length and 0.2 mm in diameter was added to the filtrate, and the filtrate was stirred by a magnetic stirrer for 2.5 min. A second test without the addition of copper but with vigorous mixing for 60 min. was also conducted.

The reduction of the intensity of the color of direct yellow 12 was measured by a spectrophotometer. The following color reductions were observed in the first test: 40% upon addition of acid, 60% upon addition of copper, and 100% after the cementation induced by the iron wire. The weight of the iron lost in this test was 28.5 mg or only slightly greater than the 21.9 mg required in accordance with the stoichiometry of $Cu^{2+}$ reduction.

No pH changes were observed during the course of the cementation-induced process, while the pH rose to 5.3 and 45.3 mg of iron was lost during the second test. No color reduction occured in the second test.

These results indicate that cementation-induced transformation of organics occurs very efficiently and rapidly, which is consistent with the basic principles discussed above, while the simple metal reduction of organics does not produce any effect.

EXAMPLE 2

The wastewater from finishing operations of a textile mill used in these tests had a rosy color and pH=8. Addition of acid to pH=3.5 and copper salt (final concentration in the solution=100 mg $Cu^{2+}$/L) did not change the color. However, addition of $Cu^{2+}$ alone changed the color to dark blue suggesting formation of $Cu^{2+}$ complex. Further addition of $H_2SO_4$ restored the original color. Cementation with iron and $Cu^{2+}$ and separation of the suspension resulted in 98.5% color removal. The process without copper with and without aeration resulted in 10% color removal. These data confirm the conclusions of Example 1.

EXAMPLE 3

The wastewater used in Example 2 was treated with the aluminum scrap (cleaned pieces of a beverage can) by wrapping pieces of aluminum 4×4.5 cm$^2$ around magnetic stirrer bars. The experimental data are presented in Table 1. The initial wastewater had pH=8 and a rosy color. Samples were treated with $H_2SO_4$ for the pH correction, and $Cu^{2+}$ was added to induce the cementation process. Two samples were also treated with $NH_4Cl$ to allow evaluation of the depassivation effect of aluminum. All samples were stirred for 3 min., with the exception of sample 6, which was stirred for 30 min. Treated samples were filtered through a sand column 2.5 cm in diameter and 15 cm high using fresh sand of 0.3 mm grain size in each test.

Addition of copper caused the color to change to dark blue, subsequent addition of $NH_4Cl$ caused the color to turn green, and the addition of copper and acid in any order did not change the original rosy color or its intensity. In tests 1 and 2, no color reduction was observed. Samples 3, 4, and 5, which were treated by the use of the cementation-induced process at pH=3.5, showed very efficient and rapid color removal, low copper residual, and the formation of an easily filterable sludge. In test 6, color removal may be attributed to the dissolution of aluminum and subsequent filtration of the sample. Sample 7, which was tested by the cementation-induced process at pH=8 for 3 min., did not show any color change. However, after pH correction to 3.5 and an additional 5 min. stirring, the filtered sample had only a light greyish color. Sample 6 was treated without copper addition for 30 min., thus imitating the metal reduction method. Only a slight color reduction, which may be attributed to the sample filtration, occurred in this test. The pH values in the cementation-induced process remained at 3.5 throughout the course of treatment. In tests 1 and 2, which were carried out without aluminum, the pH remained at 8. In test 6, which was performed without addition of copper, the pH rose to 4.6.

It was clearly observed that pieces of aluminum taken out of samples 3, 4, 5, and 7 were covered with deposits formed during the cementation-induced process, while the aluminum piece from the sample 6, in which $Cu^{2+}$ was not used, remained shiny. It also follows from Table 1 that ammonium chloride did not produce any substantial effect on the process.

Analysis of the data in Table 1 demonstrates that the major factors controlling cementation processes (sacrificial metal, noble metal salt and appropriate pH to produce electromagnetic and electrokinetic forces within a migrational layer) are also operable for color removal in wastewater.

EXAMPLE 4

Wastewater from a wood preservation plant with 1050 mg/L of total organic carbon (TOC) and 730 mg/L of emulsified oil and grease, and a pH of 6, was treated by the use of iron wire (see Example 1) and 100 mg/L $Cu^{2+}$ in the range of corrected pH values from 3 to 6 for 2 min. In all samples, approximately 70% of the TOC and 90% of the oil and grease were removed. The sludge settled in 100 ml cylinders in approximately 2 to 2.5 min. and occupied 5–7% of the volume. The settled sludge was easily

TABLE 1

| Index | Test No. | | | | | | |
|---|---|---|---|---|---|---|---|
| | 1 | 2 | 3* | 4 | 5** | 6 | 7 |
| Initial pH | 8 | 8 | 8 | 8 | 8 | 8 | 8 |
| $NH_4Cl$, mL saturated solution | 1 | 0 | 0 | 1 | 0 | 0 | 1 |
| Corrected pH | 8 | 8 | 3.5 | 3.5 | 3.5 | 3.5 | 8 |
| $Cu^{2+}$ final conc., mg/L | 100 | 100 | 100 | 100 | 100 | 0 | 100 |
| Al, cm$^2$/75 mL | 0 | 0 | 18 | 18 | 18 | 18 | 0 |
| Stirring, min | 3 | 3 | 3 | 3 | 3 | 30 | 3 |
| Second pH correction | — | — | — | — | — | — | 3.5 |
| Additional stirring, min | — | — | — | — | — | — | 5 |
| Color*** | B | G | T | T | T | R | SG |
| Color Removal, % | — | — | 99.5 | 98 | 99 | 24 | 87 |
| Filtration, min | 4.5 | 6.0 | 2.0 | 2.2 | 2.2 | 4.5 | 3.5 |
| Residual $Cu^{2+}$, mg/L | 81 | 83 | 3 | 3 | 3 | 0 | 4 |

*acid was added before $Cu^{2+}$
**$Cu^{2+}$ was added before acid
***B = blue, G = green, T = tint, R = rosy, SG = slightly greyish filterable through a paper filter and a 150 mm sand column having a grain size of 0.3 mm. The filtrate did not contain suspended solids and had a light yellow color, while the original wastewater was highly turbid, virtually nontransparent and brownish in color.

In comparison, the same wastewater was coagulated by 200 mg/L of $Al_2(SO_4)_3$ at pH=8.5 (conditions usually considered to be optimal for treatment of this wastewater). The sludge formed in this proces settled in 100 mL cylinder in 6 to 8 min. and occupied approximately 15% of the volume. The destabilized suspension was filtered through a paper filter in approximately 20 min. However, the suspension almost instantly plugged the sand column.

Figure 18:
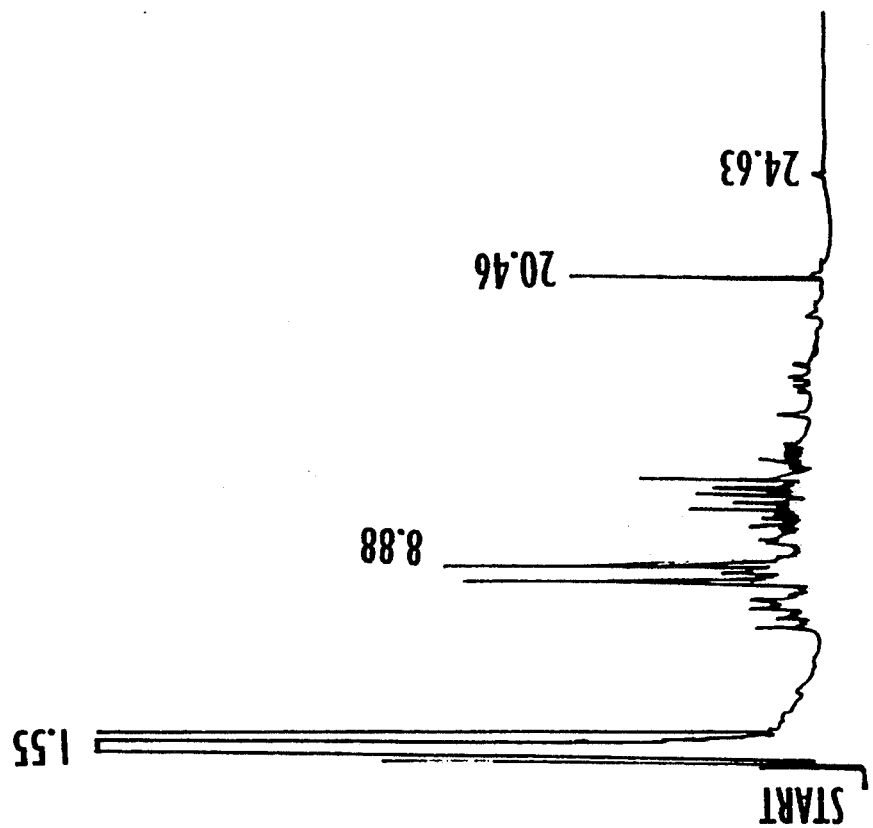
FIG. 18 is a chromatogram of wastewater from a wood preservation plant after treatment in the cementation induced process.
Figure 17:
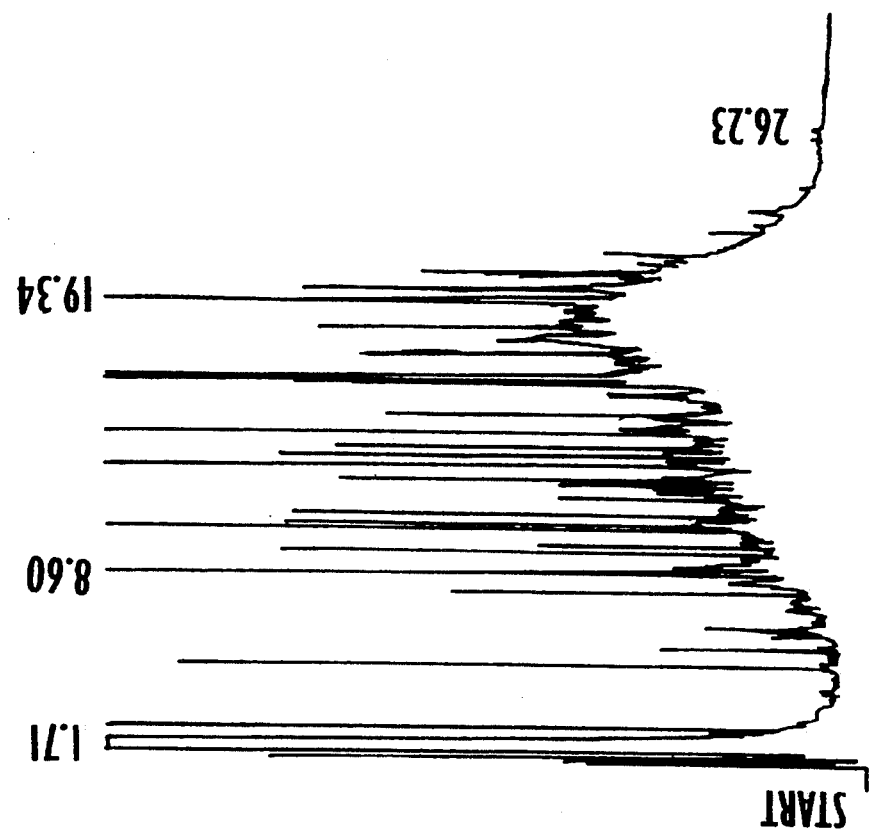
FIG. 17 is a chromatogram of wastewater from a wood preservation plant after treatment by coagulation.

Additionally, gas chromatograms of the filtered water samples treated by the use of the cementation-induced process (FIG. 18), and by aluminum salt coagulation (FIG. 17) demonstrate that the number and the concentrations of organics remaining in water after the cementation-induced process are substantially lower than those found after coagulation.

Example 4 confirms the findings of the previous examples and additionally demonstrates the usefulness of this treatment with emulsion-containing wastewaters. The better filterability of the sludge formed from the cementation-induced process can be attributed to the electrokinetic forces within the migrational layer. The description of the process and the above examples demonstrate that the migrational regime of the instant invention for the electrochemical treatment of materials is substantially faster and more efficient than known processes.

While the invention has been described in detail with particular reference to preferred embodiments thereof, it will be understood that variations and modifications can be effected within the spirit and scope of the invention as previously described and as defined by the claims. For example, various combinations of the described embodiments can be used, reactors can be operated under elevated pressure and/or temperature, and various external electrical circuits can be used to emulate the migrational regime.

What is claimed is:

1. A method for the electrochemical processing of materials which comprises the steps of:
   a) contacting an electrolyte containing the material to be processed with an electrode system comprising at least one anode and at least one cathode, wherein said material to be processed comprises an aqueous solution or emulsion or suspension: and
   b) inducing a migrational regime such that a migrational transport layer is formed at said at least one cathode to provide a local electromagnetic field, wherein said local electromagnetic field is capable of producing electromagnetic and electrokinetic forces to effect said processing of material.

2. The method of claim 1, wherein said induction step comprises creating a migrational regime cementation system.

3. The method of claim 2, wherein said electrode system comprises a sacrificial metal submerged in said electrolyte and said electrolyte comprises a salt of a second metal that is more noble than said sacrificial metal.

4. The method of claim 3, wherein the surface area of said at least one cathode is increased by connecting a cathodic material more noble than said sacrificial metal to said sacrificial metal.

5. The method of claim 4, wherein said sacrificial metal and said cathodic material are submerged in separate compartments such that said sacrificial metal compartment contains a cementation electrolyte and said cathodic material compartment contains said electrolyte containing the material to be processed.

6. The method of claim 5, wherein said sacrificial metal compartment and said cathodic material compartment are separated by a membrane comprising said cathodic material.

7. The method of claim 4, wherein said cathodic material is permeable to liquids.

8. The method of claim 7, which further comprises the step of adding noble metal ions periodically by injection through said permeable cathodic material.

9. The method of claim 7, which further comprises the step of adding noble metal ions continuously by injection through said permeable cathodic material.

10. The method of claim 3, wherein said sacrificial metal comprises fluidized particles.

11. The method of claim 1, wherein said induction step comprises applying high current density from an external electric source to said at least one cathode to create a migrational regime.

12. The method of claim 11, wherein said external electric source is comprised of pulses of current.

13. The method of claim 11, wherein said method is carried out in a compartmentalized reactor having a catholytic and an anolytic compartment separated by a membrane and having said at least one cathode and a first anode of said at least one anode in said catholytic compartment and a second anode of said at least one anode in said anolytic compartment, which further comprises the step of dialyzing said electrolyte by applying a polarizing current, said at least one cathode and said second anode connected to a source of said polarizing current and said at least one cathode and said first anode connected to a source of pulsed current.

14. The method of claim 13, wherein said membrane is an ion exchange membrane.

15. The method of claim 13, wherein said membrane is a liquid permeable membrane.

16. The method of claim 13, wherein filaments protrude from the surface of said first anode.

17. The method of claim 13, wherein filaments protrude from the surface of said cathode.

18. The method of claim 11, wherein said method is carried out in a compartmentalized reactor with a catholytic and an anolytic compartment separated by a membrane and having said cathode in said catholytic compartment and said anode in said anolytic compartment, further comprising the step of dialyzing the electrolyte by applying a polarizing current, said anode having filaments protruding across said membrane into said catholytic compartment and said cathode and said anode connected to a source of said polarizing current and a source of pulsed current.

19. The method of claim 18, wherein said membrane is an electroneutral porous membrane.

20. The method of claim 18, wherein said membrane is an ion exchange membrane.

21. The method of claim 18, wherein filaments protrude from said cathode.

22. The method of claim 1, wherein said induction step comprises creating a cementation system and applying high current density from an external electric source to said at least one cathode to create said migrational regime.

23. The method of claim 1, wherein the intensity of said local electromagnetic field is increased by the addition of an indifferent ion to said electrolyte.

24. The method of claim 1, wherein the intensity of said local electromagnetic field is increased by the addition of a promoter capable of being reduced at the outer boundary of said migrational layer.

25. The method of claim 24, wherein said promoter is selected from the group consisting of $Cr_2O_7^{2-}$ and $VO_4^{3-}$.

26. The method of claim 1, wherein the intensity of said local electromagnetic field is increased by the addition of a complexing agent to said electrolyte.

27. The method of claim 1, wherein the intensity of said local electromagnetic field is increased by increasing the temperature of said electrolyte.

28. The method of claim 1, wherein the intensity of said local electromagnetic field is increased by the addition of an anion to said electrolyte.

29. The method of claim 1, wherein the intensity of said local electromagnetic field is increased by optimizing the mixing rate of said electrolyte.

30. The method of claim 1, wherein said at least one cathode possesses a rough surface to increase the intensity of said local electromagnetic field.

31. The method of claim 1, wherein said electrolyte contains organic compounds.

32. The method of claim 1, wherein said electrolyte contains suspended or emulsified particles.

33. The method of claim 1, wherein said electrolyte comprises a mixture of noble metal ion species.

34. The method of claim 1, wherein said electrolyte comprises a mixture of indifferent ions.

35. The method of claim 1, wherein said electrolyte comprises a mixture of anions.

36. The method of claim 1, wherein said steps are performed in the presence of a reducing atmosphere.

37. The method of claim 1, and further comprising the step of adding fluidized noble metal particles to said electrolyte.

38. The method of claim 37, wherein said noble metal particles comprise cemented noble metal particles.

39. The method of claim 1, which further comprises the step of adding noble ions continuously to said electrolyte.

40. The method of claim 1, which further comprises the step of adding noble ions periodically to said electrolyte.

41. The method of claim 1, wherein said at least one cathode is permeable to liquids.

42. The method of claim 41, which further comprises the step of adding noble ions to said electrolyte by injection through said permeable cathode.

43. The method of claim 1, wherein said material to be processed comprises organic material.

44. The method claim 1, wherein said material to be processed comprises wastewater.

45. The method of claim 1, wherein said electrochemical processing of materials comprises oxidation or reduction of said material to be processed.

46. The method of claim 1, wherein said electrochemical processing of materials comprises dimerization or polymerization of said material to be processed.

47. The method of claim 1, wherein said electrochemical processing of materials comprises coagulation of mineral or organic suspended particles or emulsions.

48. The method of claim 1, wherein said electrochemical processing of materials comprises the inactivation or killing of microorganisms.

* * * * *